United States Patent [19]

Zgoda

[11] Patent Number: 5,692,388
[45] Date of Patent: Dec. 2, 1997

[54] THERMOSTAT SENSING TUBE WITH PLASTIC SPIRAL-CUT INSULATOR/PROTECTOR

[75] Inventor: E. James Zgoda, Hampton, N.J.

[73] Assignee: White Consolidated Industries, Inc., Cleveland, Ohio

[21] Appl. No.: 678,988

[22] Filed: Jul. 12, 1996

[51] Int. Cl.⁶ .................... F25D 17/06; G05D 23/12
[52] U.S. Cl. .................... 62/186; 236/99 R; 374/208
[58] Field of Search .................... 236/99 R, 99 D; 374/208, 194, 201, 210; 62/186

[56] References Cited

U.S. PATENT DOCUMENTS

| | | |
|---|---|---|
| 879,474 | 2/1908 | Kessling .................... 374/194 |
| 1,633,599 | 6/1927 | Moeller .................... 374/201 |
| 1,917,457 | 7/1933 | Otto .................... 374/194 |
| 2,234,056 | 3/1941 | Moore .................... 374/201 |
| 2,507,911 | 5/1950 | Keller .................... 236/99 D |
| 2,750,483 | 6/1956 | Voorman, Jr. . |
| 3,266,318 | 8/1966 | Abajian et al. .................... 374/201 |
| 4,618,268 | 10/1986 | Horner . |

*Primary Examiner*—William E. Tapolcai
*Attorney, Agent, or Firm*—Pearne, Gordon, McCoy & Granger LLP

[57] ABSTRACT

A thermostat assembly for a room air-conditioning unit includes a sensing tube and a thermoplastic protective tube extending over the sensing tube. The protective tube has a spiral-shaped gap which allows air flowing over the protective tube to directly contact the sensing tube so that the thermostat assembly accurately measures the temperature of the air. The protective tube protects the sensing tube from abrasion by sharp edges and insulates the sensing tube from contacting cold surfaces which could otherwise affect the performance of the thermostat assembly.

18 Claims, 4 Drawing Sheets

Fig. 4
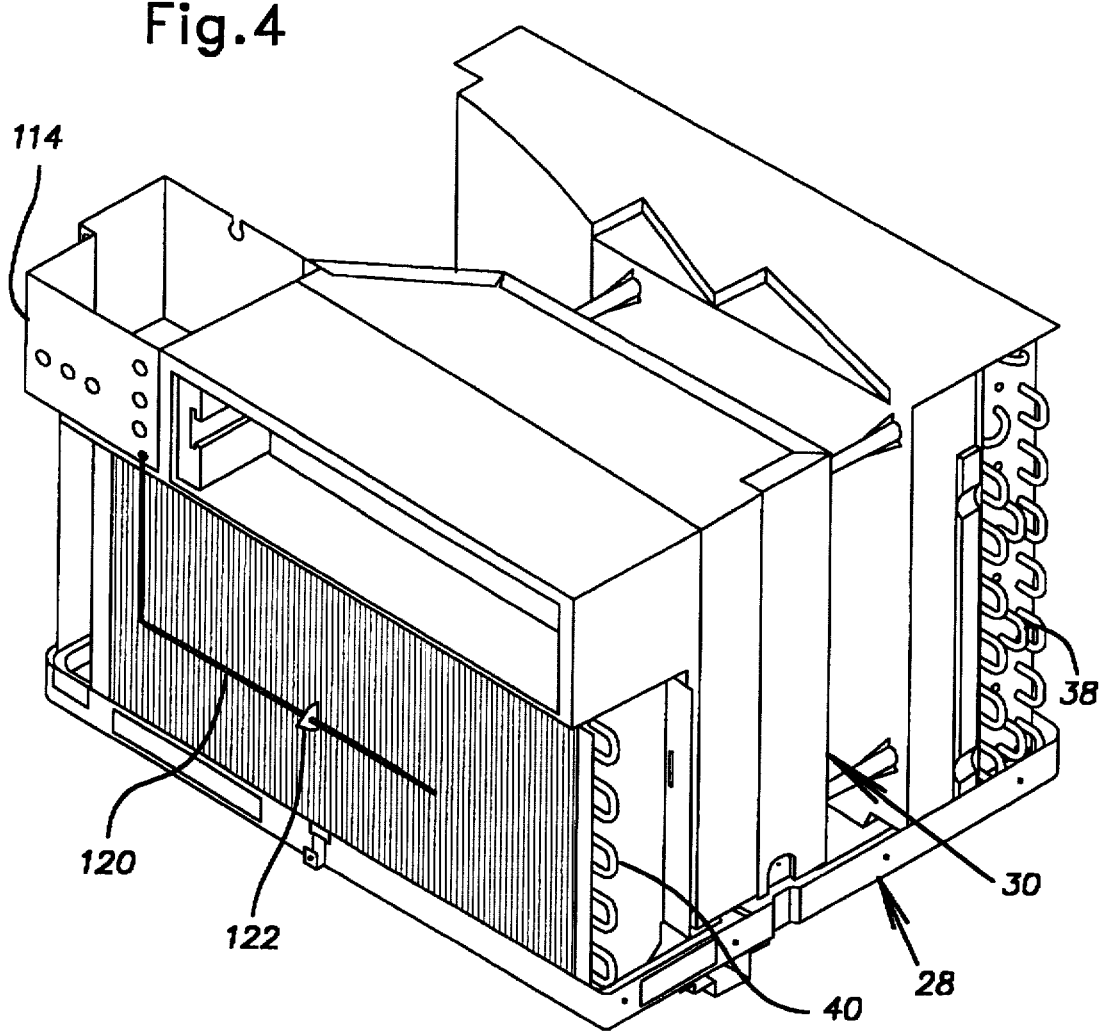
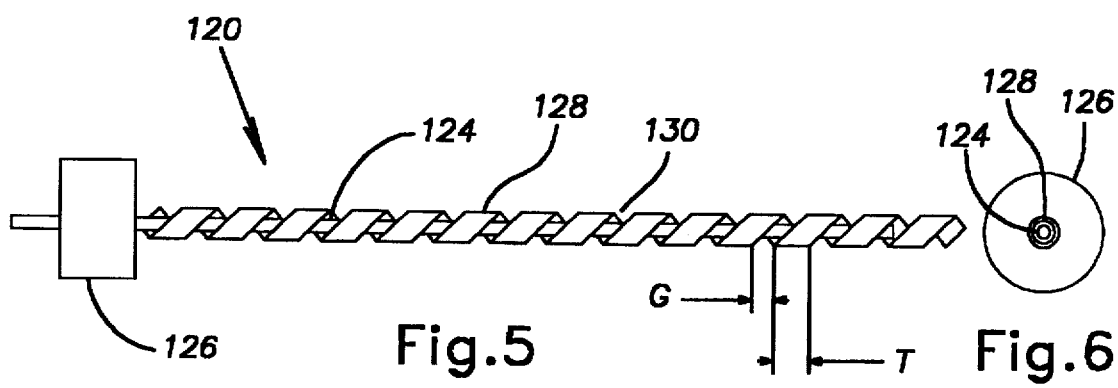
Fig. 5 Fig. 6

THERMOSTAT SENSING TUBE WITH PLASTIC SPIRAL-CUT INSULATOR/ PROTECTOR

BACKGROUND OF THE INVENTION

1. Field of the Invention

The present invention generally relates to thermostat sensing tubes of room air-conditioning units and, more particularly, to insulators and protectors for the thermostat sensing tubes.

2. Description of Related Art

Room air-conditioning units are typically located in a window or other opening in an exterior wall of a building. The units have an indoor or front side located within a room of the building and an outdoor or rear side located outside the building. A centrifugal fan or blower draws air from the room through an inlet louver or grille and over an evaporator coil which cools the air. The inlet grille is typically at the bottom of the unit front side. Cooled air centrifugally leaves the blower at a relatively high velocity and is collected and diffused by a scroll. The cooled air is upwardly directed by the scroll to a laterally extending plenum located above the blower. The cooled air negotiates a ninety-degree turn within the plenum and exits the unit through an exhaust louver or grille to the interior of the room.

In many room air-conditioning units, a thermostat assembly is located between the inlet grille and the evaporator. The thermostat assembly senses the temperature of room air and the formation of frost on the evaporator in order to appropriately control the air-conditioning unit. The thermostat assembly typically has a vapor-filled sensing tube which is easily damaged by abrasion when contacted by sharp edges. Performance of the thermostat assembly can be adversely affected by contact between the sensing tube and cold surfaces such as, for example, the evaporator coil. These problems have been attempted to be solved by inserting the sensing tube into a solid tube rigidly attached to the front of the evaporator. The solid tube however may not allow proper sensing of room air for accurate control of the air-conditioning unit. Accordingly, there is a need in the art for an air-conditioning unit having an improved thermostat assembly which allows proper sensing of room air and frost for accurate control of the air-conditioning unit. Ideally, the improved thermostat assembly should be relatively inexpensive to produce, should insulate the sensing tube from cold surfaces, and should prevent damage of the sensing tube due to abrasion.

SUMMARY OF THE INVENTION

The present invention provides an improved thermostat assembly which overcomes at least some of the above-noted problems of the related art. The improved thermostat assembly includes a vapor-filled sensing tube and a protective tube longitudinally extending over at least a portion of the sensing tube. The protective tube forms openings which allows air flowing over the protective tube to directly contact the sensing tube so that the thermostat assembly accurately measures the temperature of the air. In a preferred embodiment, the protective tube has a spiral-shaped gap to form the openings. The protective tube preferably comprises a thermoplastic material so that the openings are easily formed and so that the protective tube insulates the sensing tube from cold surfaces such as, for example, the evaporator coil which could adversely affect performance of the thermostat assembly upon contact with the sensing tube.

BRIEF DESCRIPTION OF THE DRAWINGS

These and further features of the present invention will be apparent with reference to the following description and drawings, wherein:

FIG. 4 is a prospective view of the air-conditioning unit of FIG. 1 with various covers removed for clarity;

FIG. 5 is a longitudinal elevational view of a thermostat sensing tube of FIG. 4; and FIG. 6 is an end elevational view of the thermostat sensing tube of FIG. 5.

DETAILED DESCRIPTION OF THE PREFERRED EMBODIMENT

Figure 1:
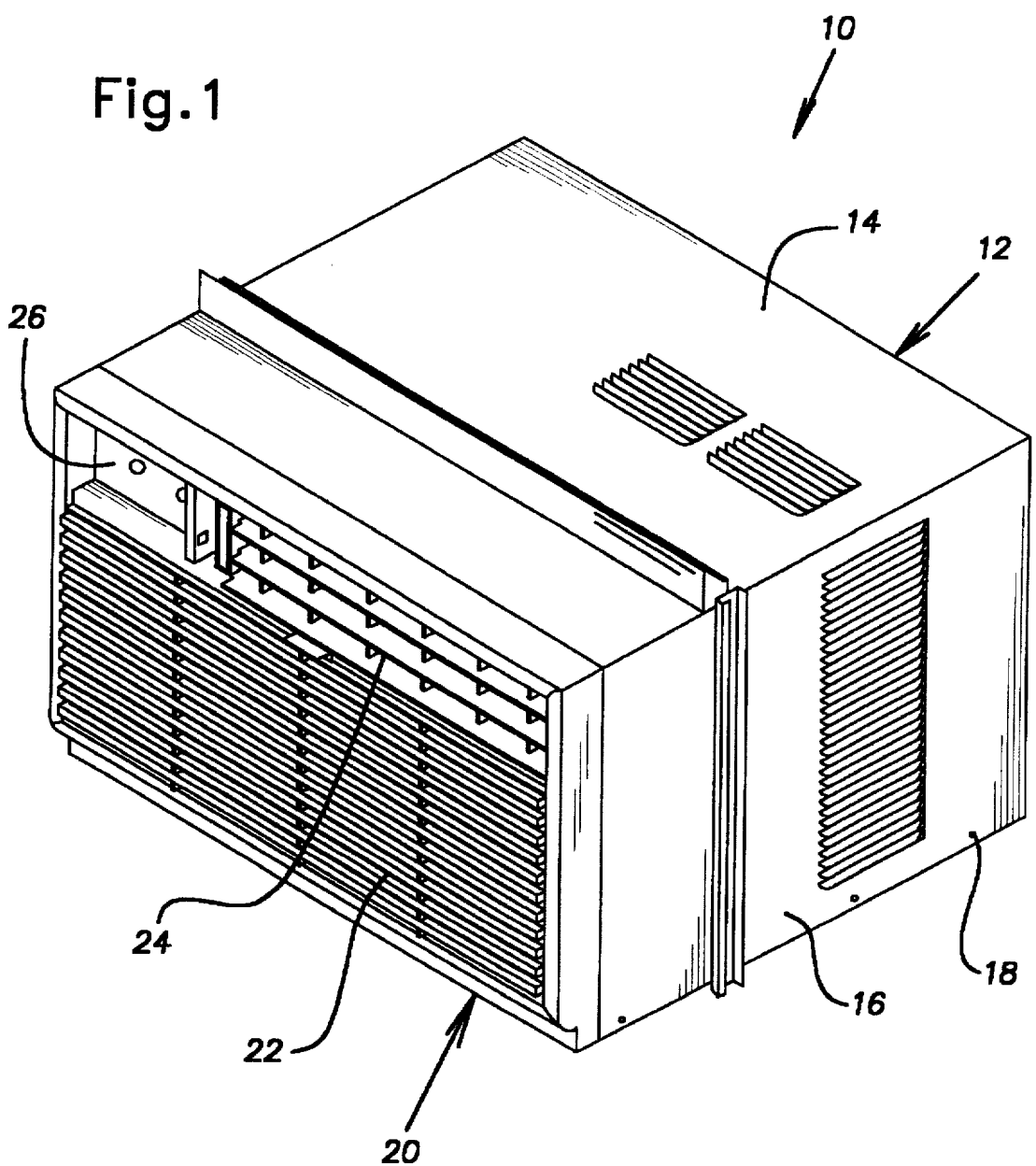
FIG. 1 is a perspective view of a room air-conditioning unit embodying the present invention.

FIG. 1 illustrates the overall exterior appearance of a room air-conditioning unit 10 incorporating the present invention. The illustrated air-conditioning unit 10 includes a one-piece sheet metal wrapper 12 providing a top surface 14 and two side surfaces 16 for the air-conditioning unit 10. The wrapper 12 is secured to the air-conditioning unit 10 by threaded fasteners 18. A molded polymeric front panel 20 provides a front surface for the air-conditioning unit 10. A lower portion of the front panel 20 has an inlet grille 22 through which air is drawn into the air-conditioning unit 10. An upper portion of the front panel 20 has an exhaust grille 24 through which cooled air is exhausted from the air-conditioning unit 10. The upper portion of the front panel 20 also has a control panel 26 for various knobs and switches which control the operation of the air-conditioning unit 10. The front panel 20 is secured by resilient clips which are integrally molded with the front panel 20.

Figure 2:
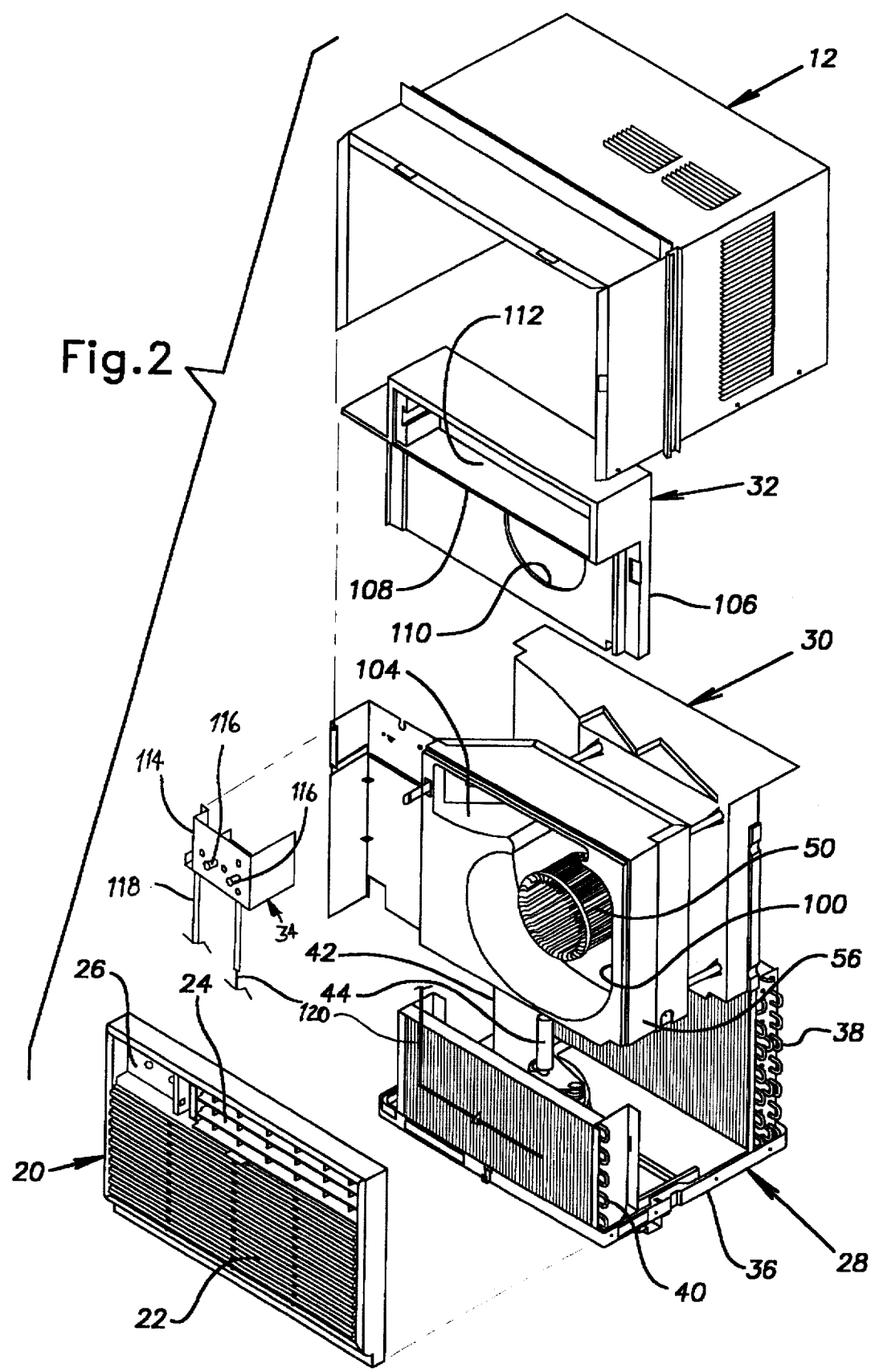
FIG. 2. is a partially-exploded perspective view of the air-conditioning unit of FIG. 1.

As best shown in FIG. 2, the air-conditioning unit 10 includes the wrapper 12, the front panel 20, a refrigeration system 28, an air handling system 30, a scroll plate 32, and an electrical control system 34. The refrigeration system 28 includes a base 36, a condenser 38 mounted vertically across the rear edge of the base 36, an evaporator 40 mounted vertically across the front edge of the base 36, a compressor 42 mounted vertically on the base between the condenser 38 and the evaporator 40 adjacent the left right side of the base 36, and a receiver 44 interconnected between the compressor 42 and the evaporator 40. The various components of the refrigeration system 28 are interconnected by tubing in a conventional manner.

Figure 3:
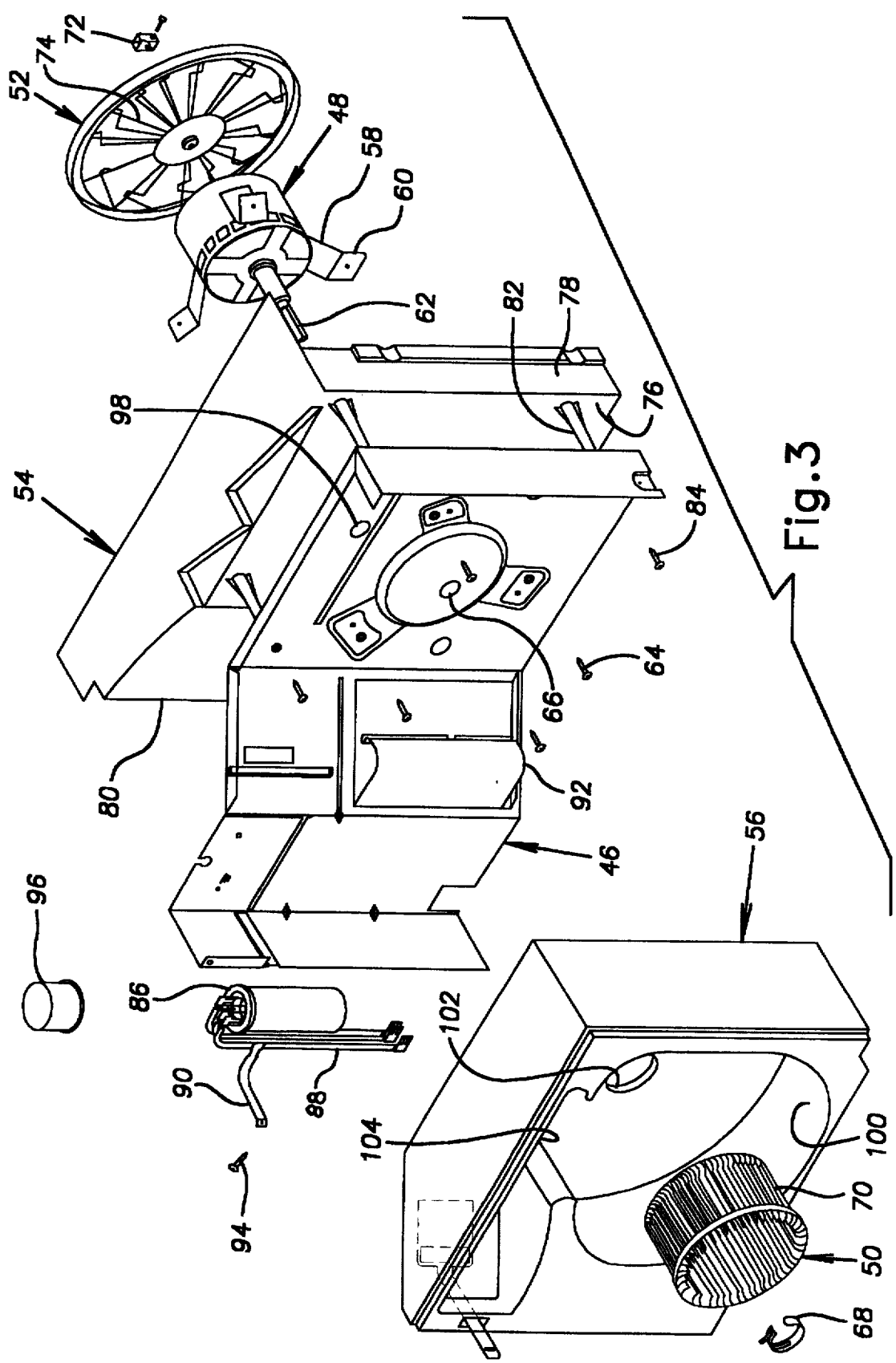
FIG. 3 is an exploded perspective view of an air handling system which is one of the components shown in exploded relation in FIG. 2.

As best shown in FIGS. 3 and 4, the air handling system 30 includes a bulkhead 46, an electric motor 48, a forward curved centrifugal fan or blower wheel 50, an axial flow condenser fan 52, a condenser shroud 54, and an evaporator scroll 56. The bulkhead 46 is a vertically oriented sheet metal panel which transversely extends across interior of the air-conditioning unit 10. The bulkhead 46 is provided with various stiffening and mounting flanges.

The motor 48 is mounted to a rear side of the bulkhead 46. The motor 48 has three legs 58 spaced about its periphery with mounting flanges 60 at ends thereof which extend perpendicular to a shaft 62 of the motor 48. The mounting flanges 60 contact a rear side of the bulkhead 46 and are held by conventional fastening means such as sheet metal screws 64. The bulk head 46 is also provided with a hole 66 through which the motor shaft 62 forwardly extends.

The blower wheel 50 is affixed on the forward end of the motor shaft 62, that is the end of the motor shaft 62 extending through the bulkhead 46, whereby the blower wheel 50 is positioned adjacent the rear side of the evaporator 40 in the assembled air-conditioning unit 10. Preferably, the blower wheel 50 is attached to the motor shaft 62 by a removable clip 68. The blower wheel 50 has a circular cross-section of a predetermined diameter and a plurality of forwardly curved vanes 70 spaced about its circumference for centrifugally blowing air.

The condenser fan 52 is mounted on the rear end of the motor shaft 62 whereby the condenser fan 52 is positioned adjacent the forward side of the condenser 38 in the assembled air-conditioning unit 10. Preferably, the condenser fan is attached to the motor shaft 68 by a clamp assembly 72. The condenser fan 52 has a circular cross-section of a predetermined diameter and a plurality of vanes 74 spaced about its axis for axially blowing air.

The condenser shroud 54 has a front wall 76 with a central round aperture sized for closely receiving the condenser fan 52 therein. The condenser shroud 54 also has rearwardly extending walls 78, 80 to generally surround the condenser 38 in the assembled air-conditioning unit 10. The condenser shroud 54 is provided with three spacers 82 spaced about the periphery of the aperture and forwardly extending from the forward side of the front wall 76. The spacers 82 contact a rear side of the bulkhead 46 and rearwardly space the condenser shroud 54 from the bulkhead 46 an adequate distance to position the motor 48 therebetween. The condenser shroud 54 is secured to the bulkhead 46 with conventional fastening means 84 such as, for example, screws which extend into the spacers 82. The condenser shroud 54 is preferably molded of a plastic material.

A capacitor 86 is electrically connected to the motor 48 by wires 88 not shown in FIG. 3. The capacitor 86 is secured to the bulkhead 46 by a sheet metal strap 90 which cooperates with a formed flange 92 of the bulkhead 46. The strap 90 is secured at one end by a notch arrangement and at the other end by a sheet metal screw 94. A capacitor boot 96 covers the top of the capacitor 86.

The evaporator scroll 56 is preferably molded of expanded polyfoam material having a rearward facing surface shaped to conform to the bulkhead 46. The evaporator scroll 56 is provided with three cylindrically shaped protrusions which rearwardly extend from the rear side of the scroll 56 into openings 98 spaced about the shaft opening 66 in the bulkhead 46 to securely hold and position the evaporator scroll 56 to the bulkhead 46.

The forward side of the evaporator scroll 56 forms a scroll involute or air guide 100 which receives the blower wheel 50. A central opening 102 is provided in the air guide 100 for the motor shaft 62 to pass therethrough to the blower wheel 50. An elongate discharge plenum 104 transversely extends across the top of the scroll 56 above the blower wheel 50 and opens into the air guide 100.

As best shown in FIG. 2, the scroll plate 32 is preferably molded of expanded polyfoam material having a panel portion 106 and a passage portion 108. The panel portion 106 is sized to mate with and cover the front side of the scroll 56 of the air handling system 30. The panel portion 106 is provided with an opening 110 for the passage of air into the interior of the blower wheel 50. The passage portion 108 laterally extends across the top of the scroll plate 32 and is sized and shaped to provide an air passage 112 from the discharge plenum 104 of the scroll 56 to the exhaust grille 24 of the front panel 22.

The electrical control system 34 includes a control box assembly 114 which is mounted to top right-hand corner of the bulkhead 46 of the air handling system 30. Various shafts 116 extend from the front of the control box assembly 114 to the control panel 26 of the front panel 20. A power cord 118 downwardly extends from the control box assembly 114 and out of the air-conditioning unit 10 to supply power to the electrical control system 34.

As best shown in FIG. 4, a thermostat assembly 120 is provided for sensing the temperature of room air and the presence of frost on the evaporator 40. The thermostat assembly 120 is located at the front surface of the evaporator 40 behind the inlet grille 22 of the front panel 20. Located in this position, the thermostat assembly 120 is directly in the flow path of incoming air. The thermostat assembly 120 downwardly extends from the control box assembly 114 and laterally extends across the front of the evaporator 40 so that a sensing portion of the thermostat assembly 120 is centrally located in front of the evaporator 40. A clip 122 is provided to mount the thermostat assembly 120 to the front of the evaporator 40. The clip 122 is preferably formed from a thermally insulating material such as, for example, plastic.

As best shown in FIGS. 5 and 6, the thermostat assembly 120 includes a vapor-filled capillary or sensing tube 124 which extends from a thermostat body 126. The sensing tube 124 is located within a protective tube 128. The protective tube 128 protects the sensing tube 124 from abrasion damage due to contact with edges of metal panels or other components of the air-conditioning unit 10. Preferably, the protective tube 128 extends the full length of the sensing tube 124 and slightly beyond the end of the sensing tube 124. The protective tube 128 can be directly contacting the outer surface of the sensing tube 124 or spaced outwardly therefrom.

The protective tube 128 is preferably a thermally insulating material such as, for example, a plastic material like polypropylene so that the protective tube 128 insulates the sensing tube 124 from contact with cold surfaces that could affect performance of the thermostat assembly 120. The protective tube 128 also insulates the sensing tube 124 from direct contact with the evaporator 40 while still properly sensing the formation of frost on the evaporator 40 without premature functioning of the thermostat assembly 120, that is, short cycling.

The protective tube 128 is provided with openings 130 which allow room air flowing over the thermostat assembly 120 to directly contact the sensing tube 124 and obtain accurate measurement of room temperature. The accurate measurement of room temperature enables more precise control of room temperature. The openings 130 also allow ice forming on the evaporator 40 to directly contact the sensing tube 124. The openings 130 are uniformly distributed across the full length of the sensing tube 124. The openings 130 of the illustrated embodiment are formed by a spiral-shaped gap. The gap is preferably produced by spiral-cutting a tube extrusion and then longitudinally stretching the tube to open the spiral-cut and form the gap. Preferably, the protective tube 128 is a thermoplastic such as, for example, polypropylene which enables the protective tube 128 to be heated, stretched, and then cooled to hold the stretched shape. The protective tube 128 can be easily heated with hot water.

The width G of the gap affects the sensitivity of the thermostat assembly 120. Preferably, the width G of the gap is about equal to the longitudinal distance T between the gap so that about 50% of the sensing tube 124 is directly exposed. It is believed the width G of the gap should be in the range from about 0.125 inches to about 0.375 inches. The protective tube 128 of the illustrated embodiment has an outer diameter of about 0.250 inches, a gap width G of about 0.250 inches, and a distance T between the gap of about 0.250. It is believed that a protective tube 128 formed of polypropylene and having an outer diameter of about 0.250 inches, a wall thickness of about 0.030 inches, a gap width G of about 0.250 inches, and a distance T between the gap Of about 0.250 inches effectively performs with sensing tubes 124 having an outer diameter up to about 0.187 inches.

During operation, the blower wheel 50 draws in room air through the inlet grille 22. The incoming air passes over the thermostat assembly 120. A portion of the air passing over the thermostat assembly 120 passes through the gap of the protective tube 128 and directly contacts the sensing tube 124. The thermostat assembly 120 accurately measures the temperature of the incoming room air so that the air-conditioning unit 10 can be appropriately controlled to maintained a desired room temperature. The room air passes over the thermostat assembly 120 and is cooled as it passes over the evaporator 40.

Cooled air is drawn into the blower wheel 50 through the opening 110 in the scroll plate 32 and is blown from the blower wheel 50 into the scroll 56. The scroll 56 upwardly directs high velocity air exiting the blower wheel 50 to the discharge plenum 104. The cooled air impinges the top surface of the discharge plenum 104 and makes a sharp right-angle turn to forwardly exit the discharge plenum 104 through the passage 112 of the scroll plate 32. Cooled air is exhausted from the scroll plate passage 112 through the exhaust grille 24 of the front panel 20. This operation of the air-conditioning unit 10 continues until the thermostat assembly 120 senses that the room air is at a desired temperature. The thermostat assembly 120 also senses any frost forming on the evaporator 40. When ice forms on the evaporator 40, the ice extends through the gap and directly touches the thermostat sensing tube 124. In response, the compressor 42 is de-energized so that the ice melts before the frost causes any damage.

Although particular embodiments of the invention have been described in detail, it will be understood that the invention is not limited correspondingly in scope, but includes all changes and modifications coming within the spirit and terms of the claims appended hereto.

What is claimed is:

1. A thermostat assembly for an air-conditioning unit comprising:

a vapor-filled sensing tube; and a protective tube longitudinally extending over at least a portion of said sensing tube, said protective tube forming openings effective for allowing air flowing over said protective tube to directly contact said sensing tube, wherein said protective tube has a spiral-shaped gap forming said openings.

2. The thermostat assembly according to claim 1, wherein said gap has a width in the range of about ⅛ inch to about ⅜ inch.

3. The thermostat assembly according to claim 1, wherein said protective tube comprises a thermally insulating material.

4. The thermostat assembly according to claim 3, wherein said protective tube is a thermoplastic material.

5. The thermostat assembly according to claim 1, wherein said openings expose about 50% of said sensing tube within said protective tube.

6. The thermostat assembly according to claim 1, wherein said openings are equally spaced along the length of said protective tube.

7. A thermostat assembly for an air-conditioning unit comprising:

a sensing tube; and a plastic protective tube extending over said sensing tube, wherein said protective tube has a spiral-shaped gap effective for allowing air flowing over said protective tube to directly contact said sensing tube.

8. The thermostat tube according to claim 7, wherein said gap has a width in the range of about ⅛ inch to about ⅜ inch.

9. The thermostat tube according to claim 7, wherein said gap has a width equal to about ¼ inch.

10. The thermostat according to claim 9, wherein said protective tube is a thermoplastic.

11. The thermostat assembly according to claim 7, wherein said gap directly exposes about 50% of said sensing tube.

12. A room air-conditioning unit comprising:

a front panel having an intake grille;

an evaporator located behind said intake grille;

a fan located to draw air through said intake grille and over said evaporator; and a thermostat assembly located between said intake grille and said evaporator in a flow path of air flowing from said intake grille to said evaporator, said thermostat assembly including a vapor-filled sensing tube and a protective tube longitudinally extending over at least a portion of said sensing tube, said protective tube forming openings effective for allowing air flowing over said protective tube to directly contact said sensing tube, wherein a spiral-shaped gap forms said openings.

13. The air-conditioning unit according to claim 12, wherein said protective tube is a thermoplastic material.

14. The air-conditioning unit according to claim 12, wherein said gap has a width in the range of about ⅛ inch to about ⅜ inch.

15. The air-conditioning unit according to claim 12, wherein said protective tube includes a thermally insulating material.

16. The air-conditioning unit according to claim 14, wherein said protective tube is a plastic material.

17. The air-conditioning unit according to claim 12, wherein said openings exposes about 50% of said sensing tube within said protective tube.

18. The air-conditioning unit according to claim 12, wherein said openings are equally spaced along the length of said protective tube.

* * * * *